Oct. 12, 1948.                        E. MERTEN                        2,451,443
                              APPARATUS FOR ORIENTATION
Filed Nov. 27, 1945                                                3 Sheets-Sheet 1

Inventor: Eugen Merten
By his Attorney:

Oct. 12, 1948.   E. MERTEN   2,451,443
APPARATUS FOR ORIENTATION
Filed Nov. 27, 1945   3 Sheets-Sheet 2

Inventor: Eugen Merten
By his Attorney:

Oct. 12, 1948.   E. MERTEN   2,451,443
APPARATUS FOR ORIENTATION
Filed Nov. 27, 1945   3 Sheets-Sheet 3

Inventor: Eugen Merten.
By his Attorney:

Patented Oct. 12, 1948

2,451,443

UNITED STATES PATENT OFFICE 2,451,443

APPARATUS FOR ORIENTATION

Eugen Merten, Houston, Tex., assignor to Shell Development Company, San Francisco, Calif., a corporation of Delaware Application November 27, 1945, Serial No. 631,055

12 Claims. (Cl. 177—352)

1

This invention pertains to a method and apparatus for orientation with regard to the earth magnetic field, and refers more particularly to a system for orienting boreholes, such as oil wells, seismometer holes, and the like, as well as various bodies, tools or instruments, such as whipstocks, knuckle joints, gun perforators, fishing tools, seismic detectors, logging devices, photographic cameras, and the like, whose oriented position within said boreholes or other relatively inaccessible places it is desired to ascertain.

Although various methods and devices have been proposed for orientation purposes, these methods commonly have certain drawbacks, such as that of lacking the desired accuracy and reliability, or that of requiring the use of complicated machinery, for example, Selsyn motors, gyroscopic compasses, etc.

It is therefore the object of this invention to provide a method whereby orientation with regard to the earth magnetic field may be effected with great accuracy, such as within one degree, by means of a relatively simple device used in combination with readily available electrical and recording equipment.

Other objects of this invention will appear from the following description taken with reference to the attached drawings wherein.

Figure 1:
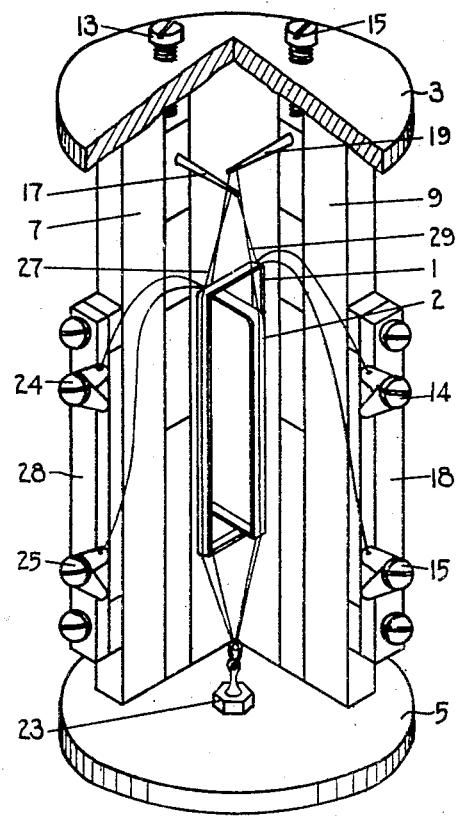
Fig. 1 is a perspective view, partly in cross-section of the present direction finder or orienting device.

Referring to Fig. 1, the present direction finder or orienting device comprises a frame or support having base plates 3 and 5 holding clamped therebetween an upright member which is shown in the drawing as comprising plates 7 and 9 at right angles to each other, although any other suitable arrangement may be used. Rigidly attached to the upright support and susceptible of adjustment by means of screws 13 and 15, are horizontal spike or beam members 17 and 19 affixed to the upright

2 frame member and preferably arranged at right angles to each other. Thin resilient wires 27 and 29 made of a material such as quartz, elinvar, etc. are passed over the beams 17 and 19 and over two coils 1 and 2, electrically insulated therefrom and from each other. The supporting wires 27 and 29 are connected below the coils to an adjustable swivel 23, affixed to the lower base plate 5. The coils 1 and 2 are thus suspended or mounted at right angles to each other for limited rotation about a common vertical axis independently of each other, the position of the frame determining the original position of said coils with regard to the earth magnetic field, the plane of coil 1 being at right angles to beam 17, and the plane of coil 2 being at right angles to beam 19. It is however obvious that any other method of mounting the coils for independent oscillation about a single axis may equally well be used.

Electric current is supplied to the coil 1 through terminals 14 and 15, and to coil 2 through terminals 24 and 25, carried on the frame members 9 and 7 and insulated therefrom by non-conductor blocks 18 and 28. The terminals 14, 15, 24 and 25 are connected to a source of current and to the rest of the electric circuit of the present system in the manner shown in Fig. 4. The frame structure is made of non-magnetic materials such as bronze, brass, aluminum, magnesium, plastics, etc.

As an example, the coils 1 and 2 may be made of No. 44 A. W. G. wire, the larger coil having 1200 turns wound to a shape of 2.1 by 0.4 by 0.1 inches, and the smaller coil having 1500 turns wound to a shape of 1.7 by 0.4 by 0.1 inches. The natural frequency periods of the coils are adjusted to about 10 cycles per second, and the damping is kept very low.

The principle of operation of the present device is based on the fact that the electromotive force which is produced in a coil oscillating in a magnetic field, such as the earth field, is a function of the position and direction of rotation of the coil with regard to said magnetic field.

When a coil such as coil 1 of Fig. 1, having N turns and an area A, is swinging with a maximum amplitude or through a maximum deflection angle $G_0$ about an axis through its center, the following expression may be used to connect the natural period T, the inertia J and the restoring moment K of the coil:

$$T = 2\pi\sqrt{J/K}$$

From the well-known relationship involving angular velocity $\omega$, frequency $f$, and period T:

$$\omega = 2\pi f = 2\pi/T$$

we derive: $\omega = \sqrt{K/J}$ and the motion of the coil, or its instantaneous deflection angle G at a time $t$ may be expressed by the equation:

$$G = G_0 \sin(\omega t + p)$$

where $p$ is the phase angle of the coil at the time $t=0$.

Denoting the angle between the magnetic north and a line normal to the initial position of the plane of the coil 1 as the azimuth D of the coil, the flux F through the coil at the time $t$ when the normal of the coil's plane forms with the direction of the earth's field H an angle $D+G$ will be:

$$F = NAH \cos(D+G)$$

from which the following expression may be derived for the electromotive force $e = dF/dt$:

$$e = -NAH \sin(D+G) dG/dt$$
$$e = -NAH \sin(D+G) \omega G_0 \cos(\omega t + p)$$

For values of G which are small compared to D, this may be written:

$$e = -NAH\omega G_0 \sin D \cos(\omega t + p)$$

It will be seen that the azimuth angle D between the initial position of the coil 1 and the earth magnetic field can be determined from this equation, with the possibility, however, that the value obtained will differ by $2D - 180°$ from the true desired value.

To eliminate this uncertainty, use is made of the coil 2, rotating about an axis parallel or, as shown in Fig. 1, coincident with that of coil 1 and having its plane displaced by 90° from that of coil 1.

Applying the subscript 1 to the symbols defined hereinabove when used with regard to coil 1, and the subscript 2 when used with regard to coil 2, we may express the azimuth of the second coil as:

$$D_2 = D_1 + \pi/2$$

and its electromotive force as:

$$e_2 = -N_2 A_2 H \omega_2 G_{20} \sin D_2 \cos(\omega_2 t + p_2)$$

or $$e_2 = -N_2 A_2 H \omega_2 G_{20} \cos D_1 \cos(\omega_2 t + p_2)$$

Denoting $$-N_1 A_1 H \omega_1 G_{10} \sin D_1 \text{ as } E_1$$

and $$-N_2 A_2 H \omega_2 G_{20} \cos D_1 \text{ as } E_2$$

the following expression is obtained:

$$\tan D_1 = \frac{E_1}{E_2} \cdot \frac{N_2 A_2 \omega_2 G_{20}}{N_1 A_2 \omega_1 G_{10}}$$

Figure 4:
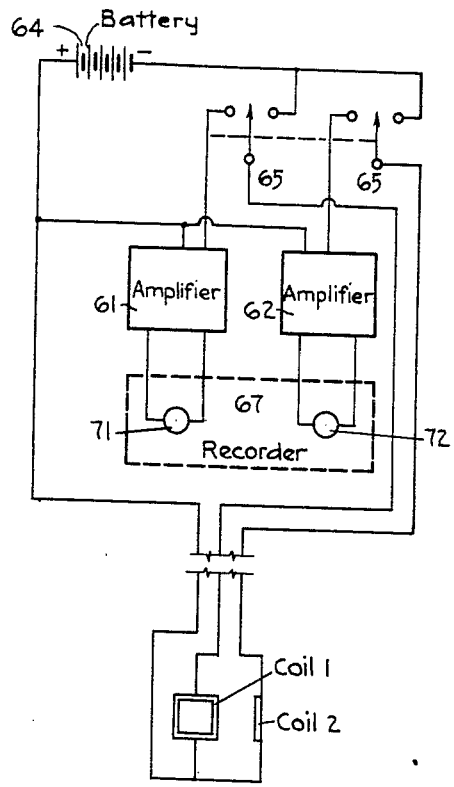
Fig. 4 is a circuit diagram showing the electrical network used in operating the present device.

The voltages $E_1$ and $E_2$, the periods $T_1$ and $T_2$, and the phases $p_1$ and $p_2$ can be observed by connecting the coils 1 and 2 into a circuit comprising a recording galvanometer, oscillograph or seismograph, as shown for example in Fig. 4, amplifying the weak voltages produced by the coils upon oscillation in the earth field, recording said oscillation voltages on an oscillogram, and analyzing said oscillogram.

The values $N_1$, $A_1$, $N_2$ and $A_2$ are constants of the coils and can be determined. The deflections $G_{10}$ and $G_{20}$ can be determined from a careful study of the oscillogram.

Figure 2:
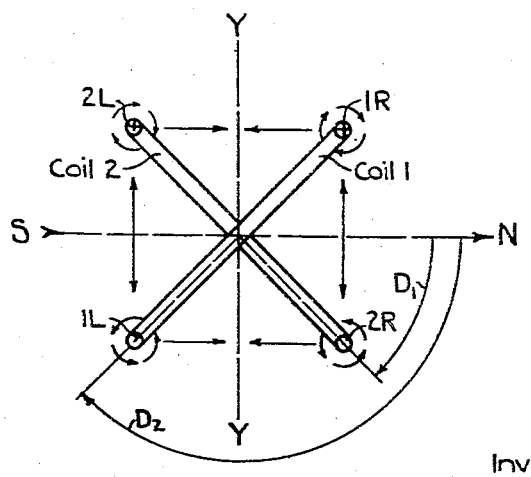
Fig. 2 is a diagrammatic cross-section in a horizontal plane of the coils 1 and 2 of Fig. 1, taken intermediate their upper and lower ends.

As stated in describing Fig. 1, coils 1 and 2 are mounted inside each other for independent oscillation about a single axis. In order to cause such oscillation, direct current is passed through these coils by means of the terminals 14, 15, 24 and 25. This produces a deflection of both coils due to the interaction of their own magnetic fields, which are thousandfold stronger than the earth magnetic field. Referring to Fig. 2, which is a diagram showing a horizontal cross-section of the coils of Fig. 1 taken intermediate their upper and lower ends, it will be seen that if the connections are such that the current in coil 1 passes downwardly in the vertical wire or wires 1R and upwardly in the vertical wire or wires 1L, while in coil 2 it passes downwardly in 2L and upwardly in 2R, the magnetic lines of force represented by small circles shown about these wires in the drawing will cause the wires 2L and 1R, as well as wires 1L and 2R to move toward each other by mutual attraction, which motion will be further aided by the repelling action exercised between wires 2L and 1L, and wires 1R and 2R respectively.

The coils 1 and 2 will therefore tend to deflect toward a common plane indicated by line Y—Y in Fig. 2. After the vibrations caused by this deflection die down, and the coils are completely at rest, for example, after 30 seconds, the application of the direct current to the coils is discontinued, which causes the coils to start swinging back to their initial position under the effect of the restoring moments exerted by the wires 27 and 29. The start of this motion is referred herein to a time $t=0$, with the coil phases $p_1 = \pm\pi/2$ and $p_2 = \mp\pi/2$ and the positive maximum deflection angle amplitudes $G_{10}$ and $G_{20}$, whereby the following expressions are obtained for instantaneous values:

$$G_1 = G_{10} \sin(\omega_1 t \pm \pi/2); G_{10} > 0$$
$$G_2 = G_{20} \sin(\omega_2 t \mp \pi/2); G_{20} > 0$$

The plus or minus signs will depend on whether the initial deflection was clockwise or counterclockwise, and will not change with the direction of the deflecting current, being constant factors of the assembly in the same way as the values $N_1$, $N_2$, $A_1$ and $A_2$.

The maximum deflecting angles $G_{10}$ and $G_{20}$ are functions of the deflecting torques $T_1$ and $T_2$ and restoring moments $K_1$ and $K_2$. The torques are proportional to the products of the direct currents $I_1$ and $I_2$ passed through the coils, and of assembly constants $M_1$ and $M_2$, as follows:

$$K_1 G_{10} = I_1 I_2 M_1$$
$$K_2 G_{20} = I_2 I_1 M_2$$

The expression for tan D, derived hereinabove, comprises the ratio $G_{10}/G_{20}$, which is independent of the currents $I_1$ and $I_2$. The instrumental constants subject to change are $K_1$ and $K_2$.

Since:

$$K_1/K_2 = (T_2^2/T_1^2)(J_1^2/J_2^2)$$

it follows that $$G_{10}/G_{20} = (M_1/M_2)(T_1^2/T_2^2)(J_2^2/J_1^2)$$

The expression for tan D, can therefore be written:

$$\tan D_1 = \frac{E_1}{E_2} \cdot \frac{N_2 A_2 \omega_2 G_{20}}{N_1 A_1 \omega_1 G_{10}}$$

$$= \frac{E_1}{E_2} \cdot \frac{N_2 A_2}{N_1 A_1} \cdot \frac{M_2 J_1^2}{M_1 J_2^2} \cdot \frac{T_2}{T_1}$$

The factor $$\frac{N_2 A_2 M_2 J_1^2}{N_1 A_1 M_1 J_2^2}$$

does not change with time, use or location and may therefore be expressed as C, the constant of the instrument, so that:

$$\tan D_1 = \frac{E_1}{E_2} \cdot C \cdot \frac{T_2}{T_1}$$

The constant C can be experimentally determined by orienting the instrument during calibration so that $D_1 = 45°$, and therefore:

$$C = \frac{T_1}{T_2} \cdot \frac{E_2}{E_1} \text{ at } 45°$$

The operation of the present method, and the calibration and application of the apparatus used in accordance therewith will now be described with regard to the orientation of a device such as a seismic detector or geophone, from which description the manner in which the present method and apparatus may be applied for the orientation of other well tools, such as knuckle joints, whipstocks, etc., or, in combination with devices such as photographic cameras, air-bubble levels, for the orientation of deflecting boreholes, will be understood by those familiar with the art of orienting underground shafts.

In seismic exploration, in order that recorded seismograms may be properly analyzed and interpreted, it is essential to measure the velocity of seismic waves, and more specifically, of their vertical and horizontal components in a particular location or area. Before undertaking actual seismic recording, it is therefore customary to place seismic detectors in a borehole, to explode a charge at a known distance therefrom, and to record on a seismogram the moment of the explosion and the seismic waves arriving at the geophones, from which record the velocity of the seismic waves may be determined. Since seismic waves, however, do not travel in straight lines, but are subject to various refraction and reflection phenomena, it is essential, for exact velocity measurements, to determine the direction from which the seismic waves arrive at the detector. Often it is important to determine whether the wave is longitudinal or transverse in character; this can only be done by knowing the orientation of the motion in space. Hence, it is obvious that an accurate orientation of detectors, and more specifically of the axis of rotation of their inertia element or mass, is in such cases an essential requirement of seismic velocity measurements.

Figure 3:
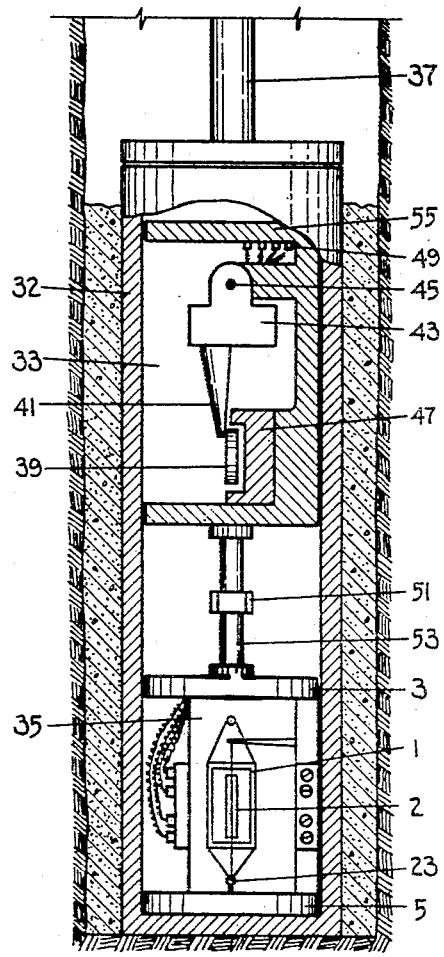
Fig. 3 is a vertical cross-section of a housing comprising the present device and a seismic detector.

Referring to Fig. 3, a seismic detector generally indicated at 33, and the present orienting device generally indicated at 35 and similar to that of Fig. 1, are mounted within a closed housing 32, which may be lowered into a borehole at the end of a cable rod or tubing 37. The detector 33 may comprise a coil 39 attached by a conical lever arm 41 to a seismograph mass 43, adapted to swing about a horizontal axis 45. When the oncoming seismic waves, and more particularly the horizontal component thereof, cause the housing 32 to oscillate in sympathy therewith, the inertia of the mass 43 causes the coil 39 to move in and out of the field of a permanent magnet 47 oscillating with the housing 32. This movement of the coil 39 in a magnetic field produces voltages which are transmitted to the surface through conductors 49, which may pass through the tubing 37. These voltages are then amplified and recorded in a manner well known in the art. It is understood that instead of an induction type detector, a capacity or any other type of detector may as well be used, and that instead of a single detector of the horizontal component type, shown in the drawing for simplicity, a plurality of such detectors, both of the horizontal and of the vertical component type may be used.

Since, as explained above, it is essential to know the direction of arrival of the seismic waves with regard to the detector 33, and more particularly with regard to the axis 45 thereof, the present orienting device 35 is mounted within the housing 32 at a distance such as about 12 inches from the detector 33. To eliminate the effect of elements such as the magnet 47 on the orienting device, a neutralizing magnet 51 may be conveniently positioned within the housing 32, for example on a rod 53 rotatably connecting the seismic and the orienting units. The unit 35, similar to that described with regard to Fig. 1, is calibrated for the purposes of this invention as follows:

Before the units 33 and 35 are placed in the housing 32 and lowered into the ground, the coils 1 and 2 are set at the surface so that a line normal to the plane of coil 1 is parallel to the rotation axis 45 of the detector, which may be readily affected, for example, by manipulation about the stem or rod 53 and adjustment of the swivel 23. For convenience the direction of this line may be marked, for example, by arranging or tracing a corresponding marking element or line on the top plate 55 of the detector frame, and giving a direction to this marking line by means of an arrow point placed at one of its ends in such a manner that when the detector coil 39 moves out of the field of the magnet 47, it rotates about its axis 45 in a clockwise direction looking in the direction of the marking arrow. The angle between the magnetic north and this marking line, measured in clockwise direction is taken as the azimuth D of the present device, as defined hereinabove.

The device, still at the surface, is then oriented in any desired manner, for example, by means of a magnetic compass. It is of especial advantage to orient the device so that the azimuth D is equal to 45°, since at that initial angle the amplitudes of the voltages produced by both coils upon oscillation are large, which facilitates calibration.

The present device is at that time connected into the circuit shown in Fig. 4, which may comprise a source of E. M. F. 64, such for example as a 45 volt battery, double throw switch 65, amplifiers of a type such as used in seismograph work, as shown at 61 and 62, and a recorder 67 having recording elements or galvanometers adapted to record the output voltages of the amplifiers, as shown at 71 and 72. Coils 1 and 2 are shown for clearness as mounted about separate parallel axes, although it will be understood that they are preferably mounted about a single axis, as described with regard to Figs. 1 and 3.

When the switch 65 is thrown to the right of Fig. 4, the battery voltage is impressed across the coils 1 and 2, causing them to be energized and to shift their initial right-angle position with regard to each other, as explained with regard to Fig. 2. When the switch 65 is subsequently thrown to the left, the battery 64 is disconnected from the circuit, the coils 1 and 2 swing back to their initial positions, and their free oscillation in the earth magnetic field produces potentials which are recorded by the galvanometers 71 and 72 in the form of traces shown in Fig. 7.

Figure 7:
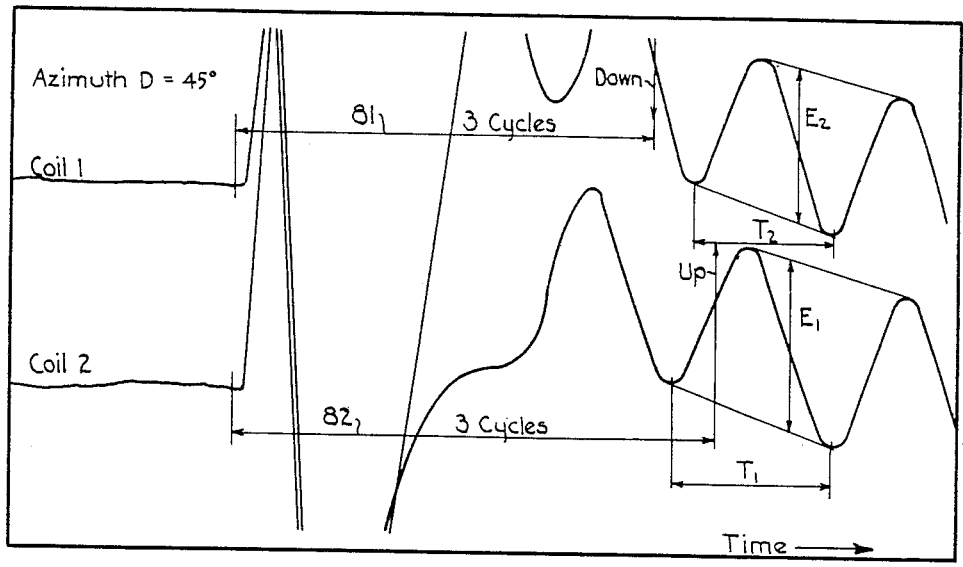
Fig. 7 is a reproduction of a part of a record obtained by means of the present device.

By a proper analysis of the photographic traces of the coil voltages shown in Fig. 7, which may be measured in any desired arbitrary units, such as millimeters, it becomes immediately possible to determine their amplitude ratio $E_1/E_2$ and their period ratio $T_1/T_2$, from which the instrument constant C may be readily calculated as described hereinabove.

The excessive amplitude of the traces within the time period indicated by lines 81 and 82 is due to cable disturbances produced by electric charges stored in the cable during the time when the battery voltage was applied to the coils 1 and 2 to cause them to deflect from their initial positions. This cable disturbance lasts however only about 0.3 second, and does not affect the accuracy of the present measurements. By measuring the lines 81 and 82 from their starting points in terms of an equal number of the respective cycles or periods $T_1$ and $T_2$, it becomes furthermore possible to determine whether the phase or first swing of each of the coils was in such a direction as to result in an upward or a downward movement of the trace as indicated in Fig. 7.

By changing, still at the surface, the orientation of the present device so as to obtain azimuth values such, for example, as 135°, 225° and 315°, complete data necessary for the calibration of the device may be obtained. A typical tabulation of such data is given hereinbelow as an example:

| Quadrant | Azimuth D | Values proportional to— | | | | C (calculated) | Direction of trace | |
|---|---|---|---|---|---|---|---|---|
| | | $E_1$ | $E_2$ | $T_1$ | $T_2$ | | Coil 1 | Coil 2 |
| | Degrees | | | | | | | |
| First (N-E) | 45 | 33.5 | 29 | 10.7 | 9.3 | .99 | Up | Down. |
| Second (S-E) | 135 | 34 | 23 | 10.7 | 9.3 | .78 | do | Up. |
| Third (S-W) | 225 | 29 | 20.5 | 10.7 | 9.3 | .81 | Down | Do. |
| Fourth (N-W) | 315 | 31 | 22.5 | 10.7 | 9.3 | .84 | do | Down. |

Average C=0.85.

It will be noted that if in the first quadrant, North-East, the direction of the trace was up for coil 1 and down for coil 2, then in the second quadrant, South-East, it was up for coil 1 and up for coil 2; in the third quadrant, South-West, down for coil 1 and up for coil 2; and in the fourth quadrant, down for coil 1 and down for coil 2. This pattern of trace direction remains constant with the present orienting device provided the latter is always connected to the recorder in the same manner.

After the orienting device has been properly calibrated, the units 33 and 35 are enclosed within the housing 32 and lowered into a borehole, being, for example, positioned on its bottom and tamped down with clay, sand or earth as shown in Fig. 3. The circuit of Fig. 4 is then operated, and the indications of the coils 1 and 2 are recorded in a manner already described with regard to the calibration of the device. Assuming as a further example that the record obtained, which is similar to that of Fig. 7, yields the following values:

$E_1 = 39.5$   $E_2 = 4.5$
$T_1 = 10.7$   $T_2 = 9.3$
Direction of trace of coil 1: down
Direction of trace of coil 2: down Inserting the proper values into the expression derived hereinabove for tan D, we have $$\tan D = C \frac{E_1}{E_2} \cdot \frac{T_2}{T_1} = 0.85 \cdot \frac{39.5}{4.5} \cdot \frac{9.3}{10.7} = 6.48$$

From a table of trigonometric functions it will be seen that
$$\tan D = 6.48$$
$$D = 81°$$

Since, from the fact that the direction of the traces of both coils was down, it follows that this value must be referred to the fourth quadrant, the final solution for D is: $D = 360° - 81° = 279°$. When, therefore, seismic waves are subsequently recorded by the detector 33, the interpretation of the seismograms obtained is based on the knowledge that the orientation of the axis 45 of the detector was 279°.

The present method may be applied in a similar manner for purposes other than orientation in seismic surveying.

Figure 5:
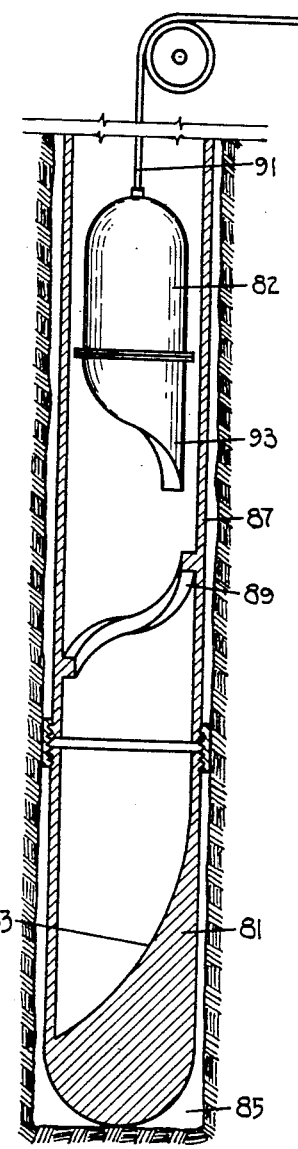
Fig. 5 is a diagram showing the application of the present device to the orientation of whipstocks.

For example, referring to Fig. 5, when it is desired to orient a whipstock 81, having a deflecting face 83 in such a manner that the borehole 85 may be deflected in a desired direction, the following procedure may be used.

The whipstock 81 is positioned within the borehole at the end of a string comprising a tubular member 87, preferably made of a non-magnetic material such as aluminum, magnesium, etc. The member 87 is provided with an internal guiding groove, rim or socket 89, which be of any suitable shape, a spiral socket being illustrated in the drawing. The present orienting device, that is, the unit 35 of Fig. 3, is lowered into the tubular member 87 in a housing 82 at the end of a cable 91 comprising the necessary electrical conductors. The housing 82 is provided with a guiding element 93 which is shaped so that when the housing 82 comes to rest on the socket 89, the engagement between the socket 89 and the guiding element 93 results in positioning the housing 82 in a predetermined position with regard to the tubular member 87. Before the elements 81 and 87 are positioned in the borehole, and before the housing 82 is lowered thereinto, the relative orientation or angular position of the face 83 of the whipstock with regard to the socket 89, and of the guiding element 93 with regard to the coils 1 and 2 contained in the housing, are adjusted in such a manner that when the housing 82 comes to rest on the socket 89, the plane of one of the coils, for example coil 1, lies in a predetermined position, for example, parallel or normal, with regard to the face 83 of the whipstock. By effecting thereupon the necessary recordings, the orientation of the deflecting face of the whipstock can be determined in the same manner as described hereinabove with regard to the orientation of the rotation axis of the seismic detector 33. Thus the orientation of the whipstock can be found without removing the indicator, and the direction of the whipstock can be corrected immediately.

Figure 6:
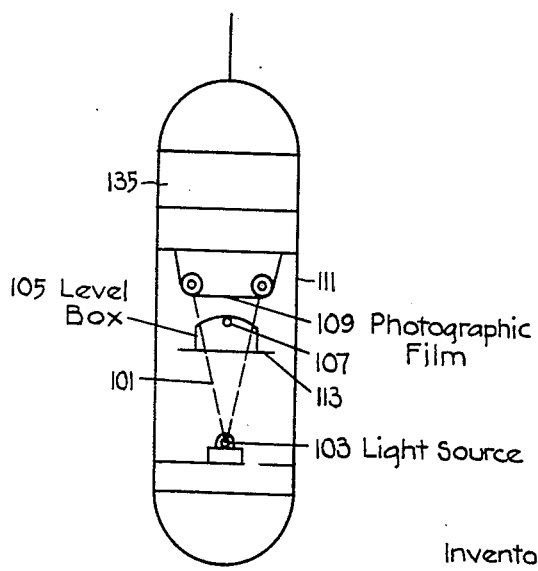
Fig. 6 is a diagram showing the application of the present device for purposes of well orientation.

The present device may furthermore be applied to measure the orientation of boreholes deviating from the vertical, one manner in which such orientations may be effected being diagrammatically illustrated in Fig. 6.

It is known that the deviation of a borehole from the vertical may be measured by projecting a beam of light 101 from a source 103 through a transparent level box 105 and thus photographing the image of an air bubble 107 on a graduated film 109.

By placing a unit 135, similar to the unit 35 of Fig. 3, within the housing 111 containing also the above level and photographic units, and by providing the transparent level box 105 with a reference marking line 113, oriented with regard to the present coils 1 and 2 contained in the unit 135, it is therefore possible to orient the deflection of any borehole into which the housing 111 is lowered by photographing the air bubble 107 and determining the orientation of the reference line 113 in the earth magnetic field by recording at the same time the indications of the coils 1 and 2 in the manner already described hereinabove. The usually small deviation of the borehole, and therefore of the axis of rotation of the coils 1 and 2 from the vertical, does not interfere in such cases with the accuracy of the present method to any appreciable degree.

The use of the present direction finder in combination with a deviation recorder as described above may sometimes be found somewhat inconvenient because the information, namely, the deviation angle and the azimuth appear on different records. It is therefore possible, to provide an instrument according to the present invention wherein the deviation angle and the azimuth are simultaneously recorded at the surface on the same paper. The principle of such an arrangement may be summarized as follows: the natural frequency of each of the two indicator coils is caused to vary as a function of the inclination of the instrument in a vertical plane normal to the area of said coil by changing the tension of the bifilar suspension of the coil. One way in which this change of tension may be effected is diagrammatically illustrated in Fig. 8 with regard to one coil only, it being understood that an identical arrangement is used also with regard to the second coil, omitted from Fig. 8 for clearness.

Figure 8:
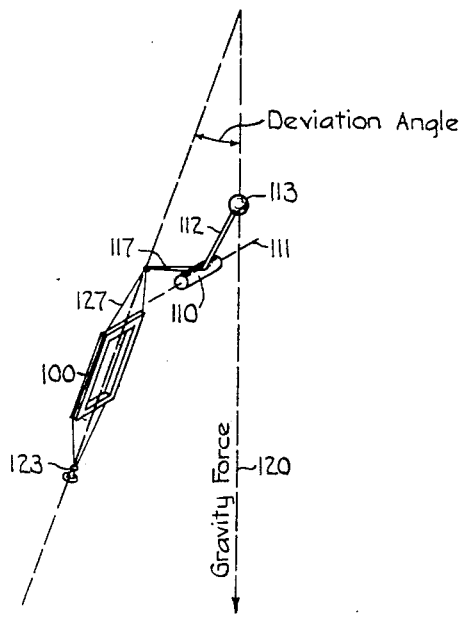
Fig. 8 is a diagram showing a modified mounting arrangement for the coils of the present orienting device.

In the embodiment of Fig. 8, the arm 117, supporting coil 100 by means of the bifilar suspension 127 and corresponding to arm 17 of Fig. 1, is rigidly attached to a pivot 110, rotatable about a substantially horizontal axis 111, parallel to the plane of the coil 1. Rigidly attached to the pivot 110 is a second arm 112, preferably forming a substantial angle with the arm 117 in a plane perpendicular to the axis 111. The arm 112 has attached thereto a mass or weight 113, acted upon by the force of gravity along a vertical line 120. The lever element 112—110—117 holds the bifilar suspension 127 in tension, and any tilt of the instrument about the axis 111 results in an increase or a decrease of said tension, and thus in a change in the natural frequency of the coil 100. An identical system being used to vary the frequency of the second coil, the variations of the frequencies of the two coils, as appearing on a seismogram after suitable calibration, indicate the inclination of the device with regard to two substantially horizontal axes of known orientation in space, and thus the deviation of the instrument or of a borehole from the vertical.

The introduction of a vertical component of the earth's field due to inclination does not measurably affect the accuracy of measurements of the present device since this effect is practically negligible at small angles, generally below 10°, such as are encountered in deviating boreholes within which the device finds its application.

I claim as my invention:

1. In a system for orientation with regard to the earth magnetic field, two coils each mounted for independent oscillation about a vertical axis in said field, means for adjusting the angular position of said coils about said axis, means for initiating an oscillation of said coils, and means for simultaneously and separately recording the voltages produced by the oscillation of said coils in the earth magnetic field.

2. A system comprising a housing adapted to be positioned in a difficultly accessible location within the earth magnetic field, recorder means for recording the orientation of said housing with regard to said field, conductor means electrically connected to said recorder means, two coils each mounted for independent oscillation within said housing, resilient means for suspending said coils in planes normally transverse to each other, and means for initiating an oscillation of said coils about said axis, said coils being electrically connected to said conductor means, whereby the voltages produced by the oscillation of said coils in the earth magnetic field are transmitted for recording to said recorder means.

3. In a system for orientation with regard to the earth magnetic field, two coils mounted for independent oscillation about a vertical axis in said field, means for adjusting said coils to a predetermined angular position about said axis, means comprising a source of current in circuit with said coils for selectively first initiating and then discontinuing a flow of current therethrough, whereby said coils are caused first to deflect from said initial position and then to revert thereto by freely oscillating at their natural frequencies, and means comprising a recorder in circuit with said coils for simultaneously and separately recording the voltages produced by the free oscillation of said coils in the earth magnetic field.

4. In a system for orientation with regard to the earth magnetic field, a frame member, two coils mounted on said frame member for independent oscillation about a vertical axis in said field, means for adjusting said coils to an initial position transverse to each other in a predetermined angular relationship with regard to said frame member, means comprising a source of current in circuit with said coils for consecutively energizing and de-energizing said coils, whereby said coils are caused to deflect from said initial position during an energization period, and to revert thereto by free oscillation at their natural frequencies during the following de-energization period, and means comprising a recorder in circuit with said coils for simultaneously and separately recording the voltages produced by the free oscillation of said coils in the earth magnetic field during said de-energization period.

5. In a system for orientation with regard to the earth megnetic field, two coils mounted for independent oscillation about a vertical axis in said field, means for adjusting said coils to a predetermined angular position about said axis, an electric circuit comprising a source of current, an electric circuit comprising a recorder, and switch means for selectively connecting said coils in parallel into one of said electric circuits.

6. For use in a magnetic orientation system in combination with electric energizing and recording circuit means, a magnetic direction finder device adapted to be positioned in the earth magnetic field, said device comprising a frame member, two coils each mounted for independent oscillation about a vertical axis in said field, means for adjusting said coils to an initial position in a predetermined angular relationship to said frame member, and insulated terminals mounted on said frame for electrically connecting said coils to said energizing and recording circuit means.

7. For use in a magnetic orientation system in combination with an electrical circuit comprising energizing and recording means, a magnetic direction finder device adapted to be positioned in the earth magnetic field, said device comprising a frame member, two coils having different natural periods mounted for independent oscillation about a vertical axis in said field, means for adjusting said coils to an initial position in a predetermined angular relationship to said frame member, and insulated terminals mounted on said frame member for electrically connecting said coils in parallel to said electrical circuit.

8. For use in a magnetic orientation system in combination with an electrical circuit comprising energizing and recording means, a magnetic direction finder device adapted to be positioned in the earth magnetic field, said device comprising a frame member, two coils suspended one within the other from said frame member for independent oscillation about a vertical axis in said field, means for adjusting said coils to an initial position substantially at right angles to each other and in a predetermined angular relationship to said frame member, and insulated terminals mounted on said frame member for electrically connecting said coils in parallel to said electrical circuit.

9. In a system adapted to be oriented with regard to the earth magnetic field, the combination of a magnetic seismic detector and an orientation indicating device for said detector, spacing means connecting said detector to said device along a substantially vertical line, compensating magnet means affixed to said spacing means, said detector comprising a rotatable element mounted about a horizontal axis, and said orientation indicating device comprising two coils mounted for independent oscillation about a vertical axis in the earth magnetic field, means for adjusting the angular position of said coils about said vertical axis with regard to the horizontal axis of said detector, means for initiating an oscillation of said coils, means for simultaneously and separately recording the voltages produced by the oscillation of said coils in the earth magnetic field, and means for recording the indications of said seismic detector.

10. In a system for orienting an inclined body with regard to the earth magnetic field, two coils adapted for independent oscillation about a common axis in said field, resilient means for suspending said coils in normally substantially vertical planes transverse to each other, means for varying the natural period of oscillation of said coils by varying the tension of said resilient suspending means as a function of the deviation of said axis from the vertical, means for initiating an oscillation of said coils, and means for simultaneously and separately recording the voltages produced by the oscillation of said coils in the earth magnetic field.

11. In a system for orienting a seismic detector with regard to the earth magnetic field, the combination of a seismic detector comprising a rotatable element mounted about a horizontal axis, an orientation indicator comprising two coils mounted for independent oscillation about a vertical axis in the earth magnetic field, means for adjusting the angular position of said coils about said vertical axis with regard to the horizontal axis of said detector element, means for initiating an oscillation of said coils, means for simultaneously and separately recording the voltages produced by the oscillation of said coils in the earth magnetic field, and means for recording the indications of the seismic detector.

12. In combination with a seismic system comprising a seismic detector having an element mounted about a horizontal axis for oscillation under the impact of seismic waves and means for recording said oscillations, an orientation indicator for said detector, said indicator comprising two coils mounted for independent oscillation about a vertical axis in the earth magnetic field, means for adjusting the angular position of said coils about said vertical axis with regard to the horizontal axis of said detector element, means for initiating an oscillation of said coils, and means for simultaneously and separately recording the voltages produced by the oscillation of said coils in the earth magnetic field.

EUGEN MERTEN.

REFERENCES CITED

The following references are of record in the file of this patent:

UNITED STATES PATENTS

| Number | Name | Date |
| --- | --- | --- |
| 1,799,238 | Leib | Apr. 7, 1931 |
| 1,925,223 | Ahlburg | Sept. 5, 1933 |
| 2,190,950 | Potopenko | Feb. 20, 1940 |
| 2,350,080 | Sproule | May 30, 1944 |
| 2,376,883 | Riggs et al. | May 29, 1945 |